(12) United States Patent
Tsutsumi et al.

(10) Patent No.: US 8,619,330 B2
(45) Date of Patent: Dec. 31, 2013

(54) IMAGE PROCESSING APPARATUS AND IMAGE PROCESSING METHOD

(75) Inventors: Takayuki Tsutsumi, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 12/949,025

(22) Filed: Nov. 18, 2010

(65) Prior Publication Data

US 2011/0122451 A1    May 26, 2011

(30) Foreign Application Priority Data

Nov. 24, 2009   (JP) ................. 2009-266770

(51) Int. Cl.
   *G06K 15/00*       (2006.01)
(52) U.S. Cl.
   USPC ......... 358/3.06; 358/3.03; 358/3.09; 358/3.1; 358/3.12; 358/3.14; 358/3.26
(58) Field of Classification Search
   None
   See application file for complete search history.

(56) References Cited

U.S. PATENT DOCUMENTS

2004/0085585 A1 *   5/2004   Feng et al. ............... 358/2.1

FOREIGN PATENT DOCUMENTS

| JP | 7-154599 A | | 6/1995 |
| JP | 09238259 | * | 9/1997 |

OTHER PUBLICATIONS

Machine translation of JP Pub 09238259 to Shuichi et al.*
Human translation of JP 09238259 to Shuichi et al.*

* cited by examiner

*Primary Examiner* — Fan Zhang
*Assistant Examiner* — Haris Sabah
(74) *Attorney, Agent, or Firm* — Canon U.S.A., Inc. IP Division

(57) ABSTRACT

An apparatus includes a processing unit configured to perform halftone processing for input image data and output halftone image data, a determination unit configured to determine a mixing ratio based on a difference value between a low frequency component of the halftone image data and a low frequency component of the input image data, and a mixing unit configured to mix the input image data and the halftone image data based on the mixing ratio.

15 Claims, 22 Drawing Sheets

SPATIAL FREQUENCY CHARACTERISTICS OF VISUAL SYSTEM

FIG. 6A

| 25 | 52 | 52 | 67 | 79 | 79 | 52 | 26 | 26 | 14 |
|----|----|----|----|----|----|----|----|----|----|
| 45 | 42 | 26 | 40 | 53 | 53 | 52 | 54 | 54 | 28 |
| 64 | 45 | 27 | 41 | 41 | 27 | 39 | 54 | 54 | 28 |
| 64 | 59 | 55 | 55 | 40 | 25 | 38 | 40 | 28 | 15 |
| 32 | 43 | 55 | 55 | 52 | 50 | 50 | 39 | 26 | 38 |
| 43 | 43 | 43 | 28 | 38 | 50 | 50 | 53 | 52 | 78 |
| 87 | 58 | 42 | 27 | 39 | 39 | 25 | 40 | 52 | 78 |
| 87 | 58 | 54 | 53 | 53 | 40 | 27 | 41 | 40 | 39 |
| 44 | 29 | 40 | 53 | 53 | 53 | 55 | 55 | 43 | 28 |
| 0  | 0  | 13 | 26 | 26 | 53 | 83 | 83 | 71 | 56 |

FIG. 6B

| 0   | 57 | 57 | 142 | 113 | 113 | 57  | 28  | 28 | 0  |
|-----|----|----|-----|-----|-----|-----|-----|----|----|
| 57  | 57 | 28 | 85  | 85  | 85  | 85  | 85  | 85 | 28 |
| 57  | 28 | 0  | 28  | 57  | 57  | 85  | 85  | 85 | 28 |
| 57  | 28 | 0  | 0   | 28  | 28  | 57  | 57  | 57 | 28 |
| 0   | 0  | 0  | 0   | 57  | 57  | 57  | 28  | 28 | 28 |
| 57  | 28 | 0  | 0   | 57  | 57  | 57  | 57  | 57 | 57 |
| 142 | 85 | 57 | 28  | 57  | 28  | 28  | 57  | 57 | 57 |
| 142 | 85 | 85 | 85  | 85  | 57  | 28  | 57  | 28 | 28 |
| 85  | 57 | 85 | 85  | 85  | 85  | 85  | 85  | 57 | 28 |
| 0   | 0  | 28 | 57  | 57  | 113 | 142 | 142 | 85 | 57 |

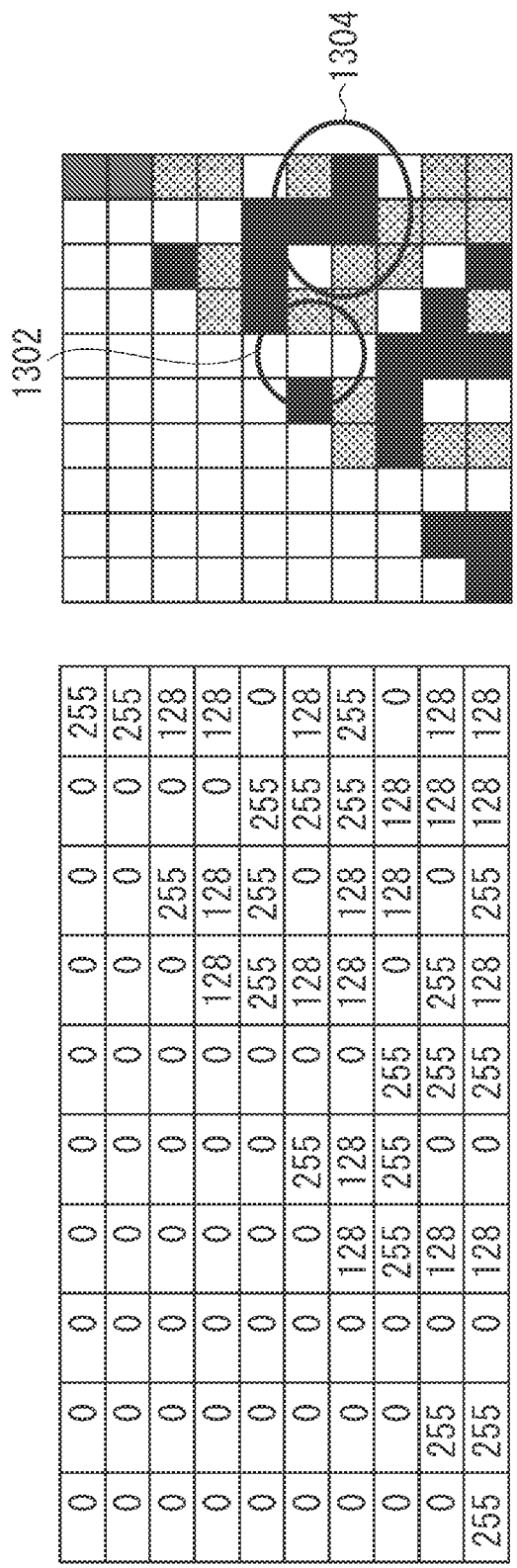

FIG. 15

| -1 | -1 | -1 |
|---|---|---|
| -1 | 8 | -1 |
| -1 | -1 | -1 |

FIG. 19

| AREA | A | B | C |
|---|---|---|---|
| EDGE INFORMATION 1411 E | \|EI\| >= 40 | 40> \|EI\| >= 10 | 10> \|EI\| > = 0 |
| SELECTED MIXING RATIO INFORMATION CANDIDATE VALUE | 1ST MIXING RATIO INFORMATION CANDIDATE VALUE 1715 | 2ND MIXING RATIO INFORMATION CANDIDATE VALUE 1716 | 3RD MIXING RATIO INFORMATION CANDIDATE VALUE 1717 | ental
IMAGE PROCESSING APPARATUS AND IMAGE PROCESSING METHOD

BACKGROUND OF THE INVENTION

1. Field of the Invention

The present invention relates to an image processing apparatus and an image processing method that perform pseudo-halftone processing for multivalued image data.

2. Description of the Related Art

In general, a digital image processing apparatus such as a digital printer including a laser beam printer is widespread as a consequence of development of digital devices, in substitution for a conventional analog image processing apparatus. The digital image processing apparatus usually adopts a method for gradation reproduction with halftone processing such as a dither method for reproducing a halftone.

Above mentioned method is used for a portion, e.g., a flat portion, which consists of a small amount of high frequency components. However, in an image having a periodic pattern such as halftone dots or a character/thin line portion, a dither periodic pattern interferes with a high frequency component (particularly, a periodic pattern close to that of a dither period) included in an input image. Accordingly, periodic fringe pattern (hereinafter, referred to as moire), i.e., a moire phenomenon is generated.

In contrast, in a portion, e.g., a flat portion showing a small amount of high frequency components, in which a gradation expression can be achieved using the dither method, pseudo-halftone processing using the dither method is employed. On the other hand, in a portion, e.g., a character or thin line portion showing a large amount of high frequency components, an input image is converted into an analog signal without the dither processing, and the converted signal is compared with a periodic pattern signal and is then subjected to image processing of pulse width modulation. As described above, with a method discussed in Japanese Patent Application Laid-Open No. 7-154599, processing contents are switched depending on a threshold (image pattern).

However, in processing for switching between an image that is subjected to the dither processing and an image that is not subjected to the dither processing depending on the threshold, at a switching portion of the processing, the dot structure extremely changes. Therefore, particularly, in a natural image, the strangeness can be felt at the switching portion of the processing.

SUMMARY OF THE INVENTION

According to an aspect of the present invention, an apparatus includes a processing unit configured to perform halftone processing for input image data and output halftone image data, a determination unit configured to determine a mixing ratio based on a difference value between a low frequency component of the halftone image data and a low frequency component of the input image data, and a mixing unit configured to mix the input image data and the halftone image data based on the mixing ratio.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate examples of image data output from a first low-pass filter and a second low-pass filter according to the first exemplary embodiment.

FIGS. 13A and 13B illustrate examples of output image data according to the first exemplary embodiment.

FIG. 15 illustrates a 3×3 Laplacian filter according to the second exemplary embodiment.

FIG. 19 illustrates a table of selection condition example of a selector according to the second exemplary embodiment.

DESCRIPTION OF THE EMBODIMENTS

Various exemplary embodiments, features, and aspects of the invention will be described in detail below with reference to the drawings.

Figure 1:
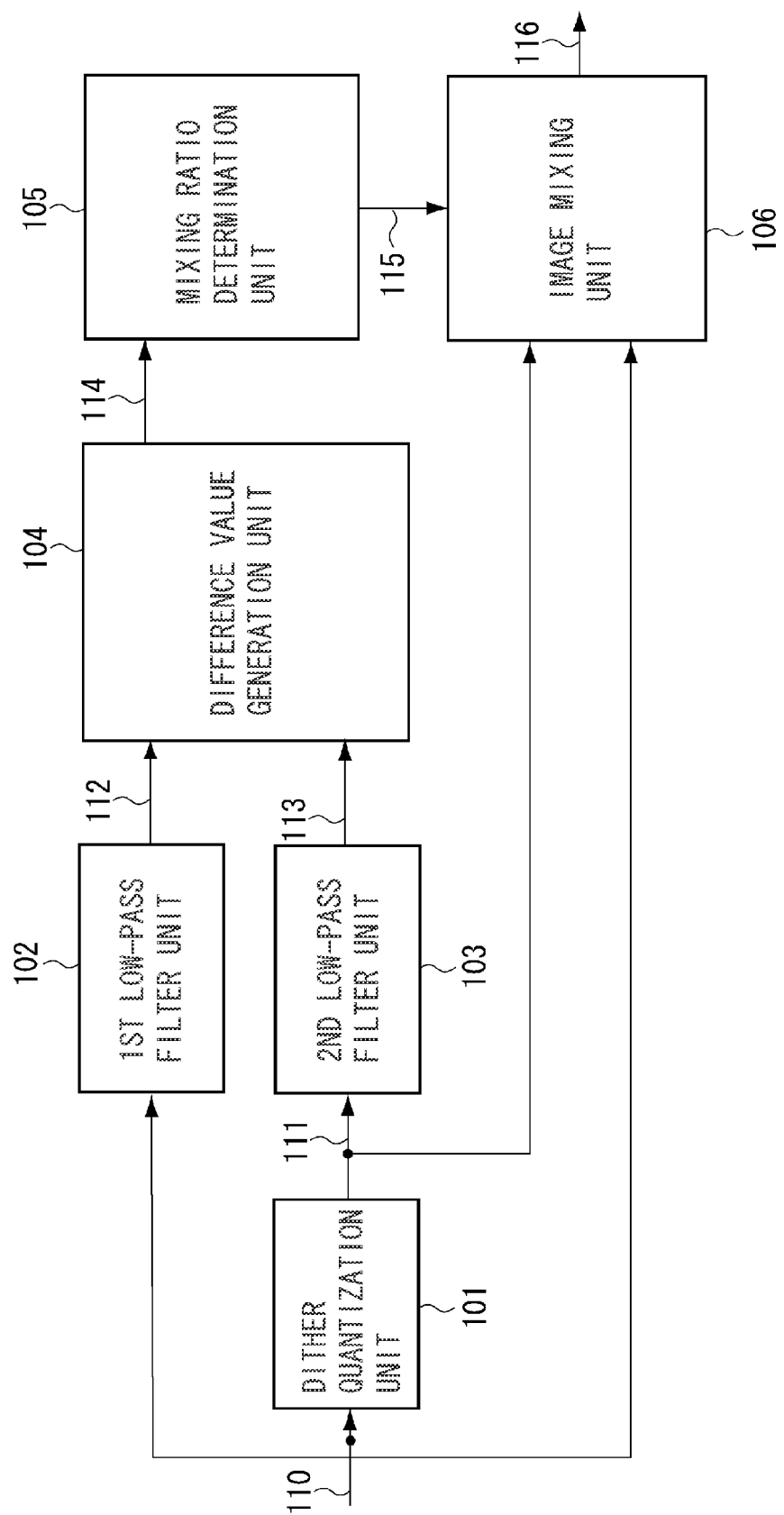
FIG. 1 is a block diagram illustrating a configuration example of an image processing apparatus according to a first exemplary embodiment of the present invention.

A circuit configuration and an operation are described below according to a first exemplary embodiment of the present invention. FIG. 1 is a block diagram illustrating a configuration example of an image processing apparatus according to the first exemplary embodiment. Referring to FIG. 1, an input terminal 110 inputs an image (hereinafter, referred to as input image data) received from an external apparatus (e.g., a computer apparatus, a controller, or a document reading apparatus, not shown).

Figure 2:
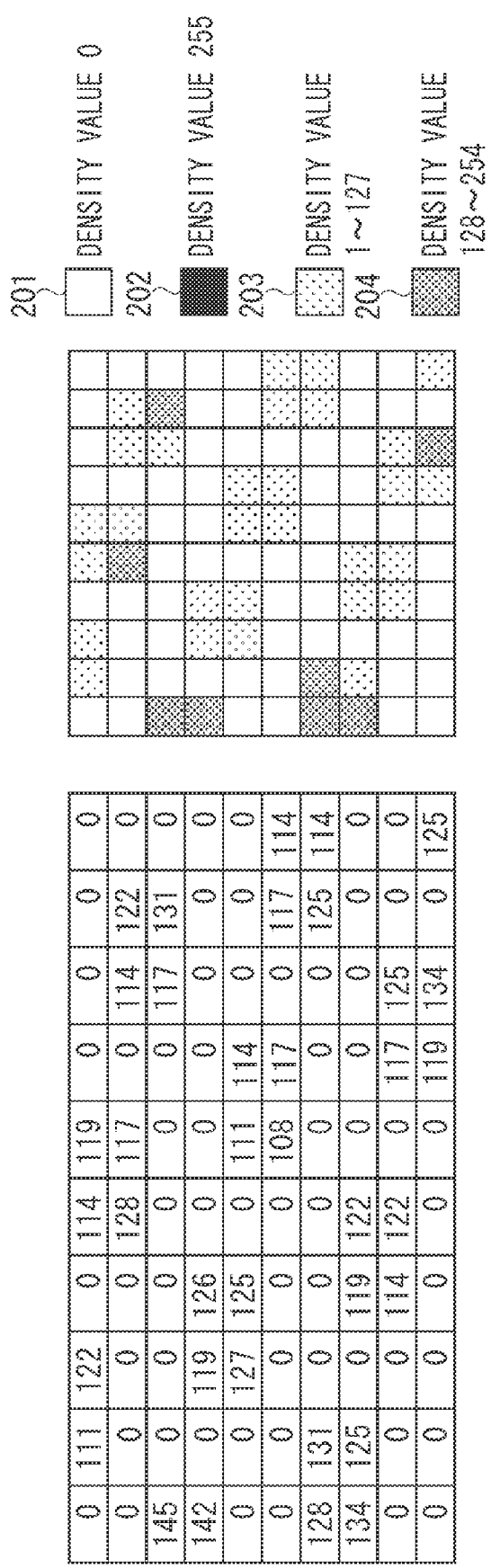
FIG. 2 illustrates an example of input image data according to the first exemplary embodiment.

FIG. 2 illustrates an example of the input image data. Referring to FIG. 2, one square indicates one pixel and a numeral of the each pixel indicates a density value. Images 201 to 204 express the each pixel of the input image data so that a visual image can be easily made. In FIG. 2, a pixel with a density value 0 is a white pixel illustrated by the pixel image 201, and a pixel with a density value 255 is a black pixel illustrated by the pixel image 202. With respect to a halftone density value other than the density values 0 and 255, pixels with density values 1 to 127 are illustrated by the pixel image 203, and pixels with density values 128 to 254 are illustrated by the pixel image 204. As will be obvious with reference to FIG. 2, the input image data includes a periodic pattern.

Figure 3:
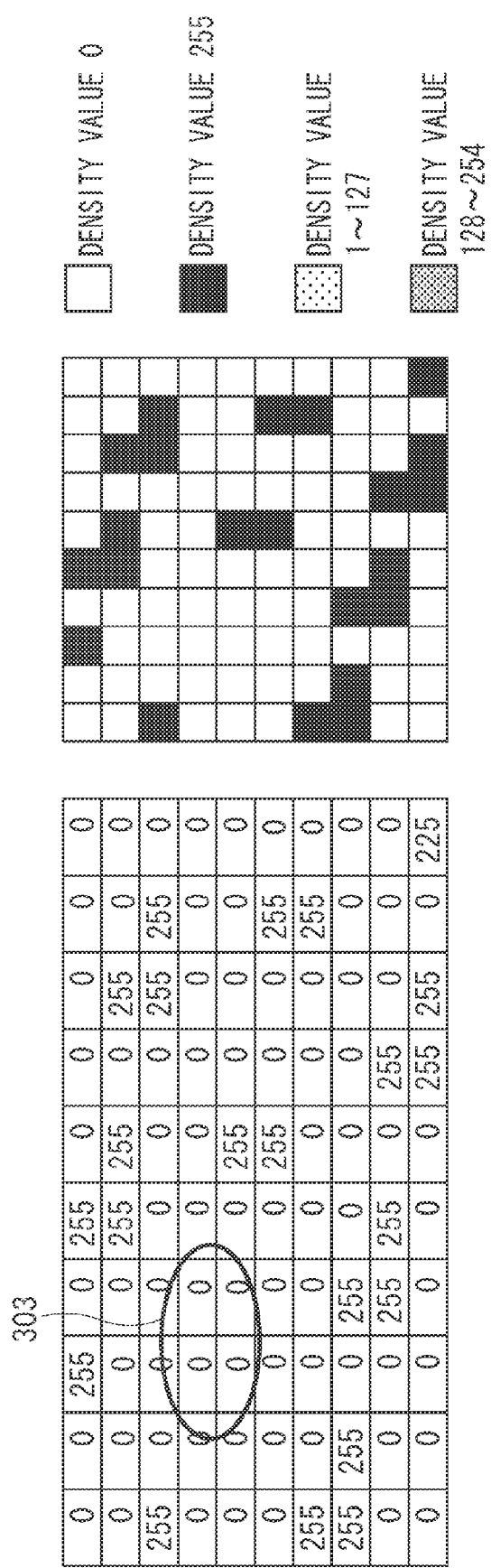
FIG. 3 illustrates an example of image data output from a dither quantization unit according to the first exemplary embodiment.

The operation is described assuming that the input image data illustrated in FIG. 2 is input, in the first exemplary embodiment. Referring to FIG. 1, a dither quantization unit 101 functions as halftone processing means configured to perform predetermined pseudo-halftone processing (halftone processing) of input multivalued image data to generate a halftone image. According to the present exemplary embodiment, image data is input and the dither quantization unit 101 then performs dither processing of the input image data with a well known dither method, and outputs image data 111. FIG. 3 illustrates an example of the image data 111 after the dither processing of the dither quantization unit 101 is performed. A description with reference to FIG. 3 is similar to that with reference to FIG. 2 and is therefore omitted.

When the image data having a period such as the input image data in FIG. 2 is subjected to the dither processing, moire can occur by interference. For example, all density values after the dither processing illustrated by an area 303 in FIG. 3 corresponding to pixels with the density values 119 to 127 in the input image data in FIG. 2 are 0. When such a condition periodically occurs, moire is generated, thereby causing deterioration in image quality.

Figure 4:
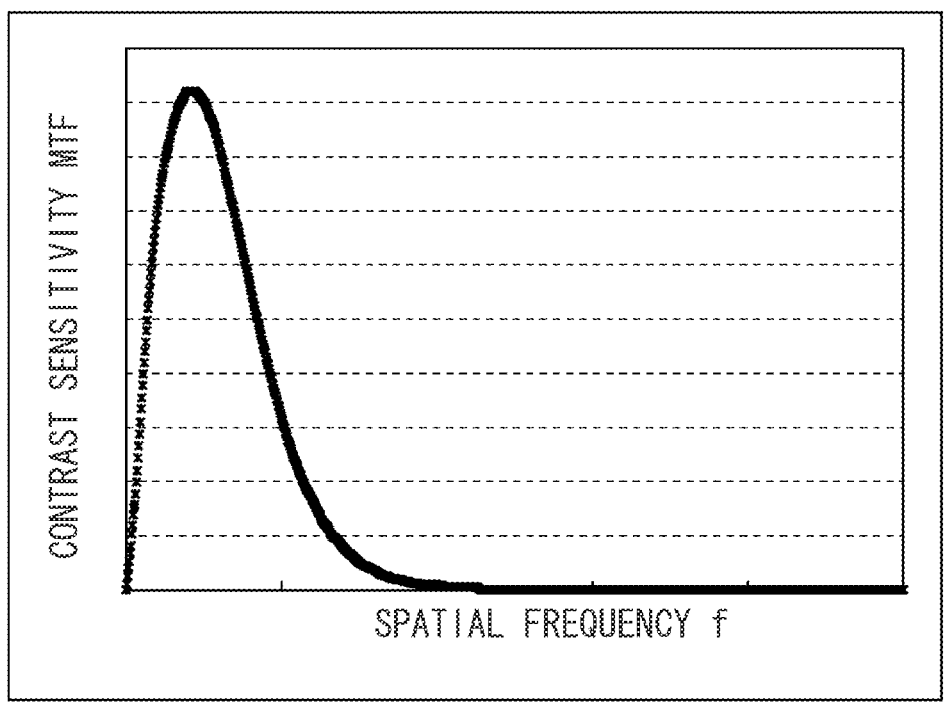
FIG. 4 illustrates spatial frequency characteristics of a visual system according to the first exemplary embodiment.

Then, as an index for detecting the occurrence of moire, the density variation between the input image and a dither image is used. As the density variation is larger, the difference in density between the input image data and the image data 111 after the dither processing is increased. Therefore, the occurrence of the moire is highly possible. However, according to spatial frequency characteristics of a visual system illustrated in FIG. 4, the sensitivity, i.e., a modulation transfer function (MTF) at the high frequency component is small. Thus, the density variation at the high frequency component cannot influence the moire.

The dither image includes a specific noise component (dither noise) due to the dither pattern. For these reasons, the high frequency component in the input image data and the image data 111 after the dither processing is performed is to be removed in advance before a difference value generation unit 104 calculates the density variation. As means configured to remove the high frequency components, a low-pass filter is used.

A first low-pass filter unit 102 inputs the image data, and performs first low-pass filter processing. The first low-pass filter unit 102 then performs well-known low-pass filter processing on the input image data, and outputs image data 112 from which the high frequency component is removed.

A second low-pass filter unit 103 inputs the image data 111 output from the dither quantization unit 101. The second low-pass filter unit 103 performs second low-pass filter processing on the image data 111 with a well known method after the dither processing is performed, and removes the high frequency component. Further, the second low-pass filter unit 103 outputs image data 113 subjected to the same gradation expression as applied to the image input from the input terminal 110. According to the present exemplary embodiment, a filter size and a filter coefficient of the first low-pass filter unit 102 are identical to those of the second low-pass filter unit 103.

The difference value generation unit 104 inputs an output value (image data 112) of the first low-pass filter unit 102 and an output value (image data 113) of the second low-pass filter unit 103. Further, the difference value generation unit 104 calculates the difference absolute value (hereinafter, referred to as a density variable value) therebetween and outputs a density variable value 114. And thus, the difference value generation unit 104 obtains the difference absolute value between the low frequency component of the input image and the low frequency component of the dither image. Therefore, frequency characteristics of the first low-pass filter unit 102 are to be identical to those of the second low-pass filter unit 103. In order to cancel the dither noise, a frequency component higher than the dither period is cut.

Figure 5:
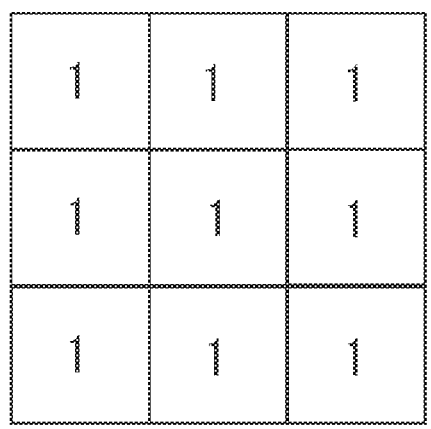
FIG. 5 illustrates a 3×3 low-pass filter according to the first exemplary embodiment.

A description is given with regard to operation examples of the first low-pass filter unit 102, the second low-pass filter unit 103, and the difference value generation unit 104. The input image data illustrated in FIG. 2 and the image data after the dither processing illustrated in FIG. 3 is subjected to processing of a 3×3 low-pass filter illustrated in FIG. 5, and the results illustrated in FIGS. 6A and 6B are obtained. One square in FIGS. 6A and 6B indicates one pixel, and a numeral of the pixel indicates a density value. The difference absolute value between the image data in FIGS. 6A and 6B is calculated, thereby obtaining a density variable value illustrated in FIG. 7.

Figure 7:
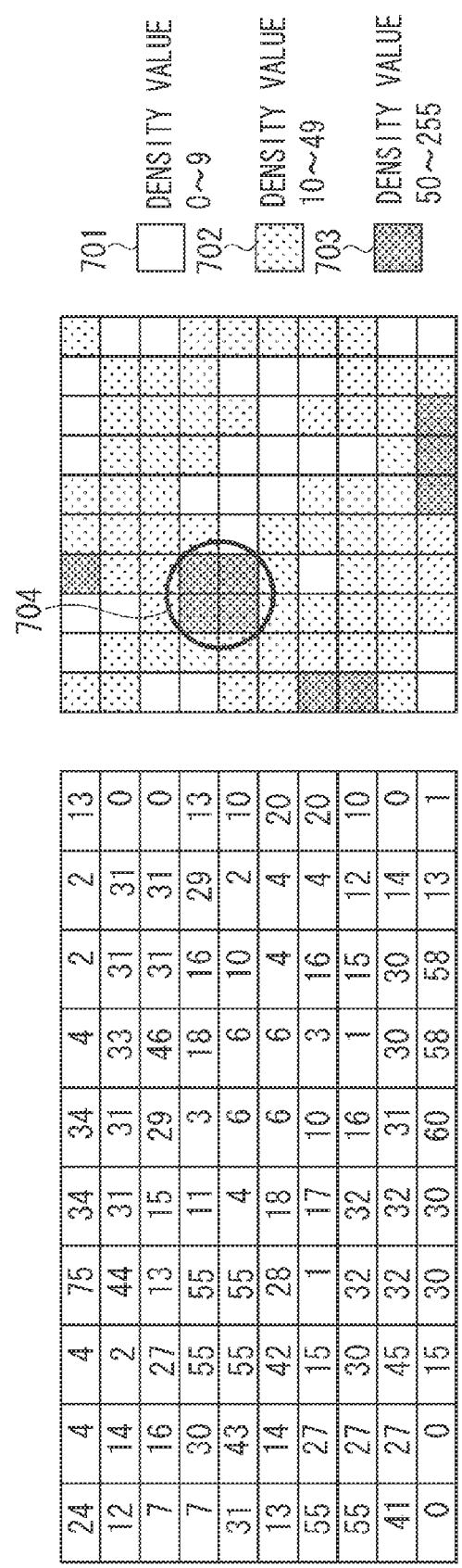
FIG. 7 illustrates an example of a density variable value output from a difference value generation unit according to the first exemplary embodiment.

One square in FIG. 7 indicates one pixel and a numeral of the pixel indicates a density variable value. Pixels are expressed by images 701 to 703 so that a visual image can be easily made. Pixels with density variable values 0 to 9 are expressed by the pixel image 701, pixels with density variable values 10 to 49 are expressed by the pixel image 702, and pixels with density variable values 50 to 255 are expressed by the pixel image 703. Since an area 704 with a large density variable value in FIG. 7 indicates the same area 303 illustrated in FIG. 3, obviously, the size of the density variable value has a correlation with the occurrence of moire. The above-described processing enables an output of the density variable value 114 for detecting the moire with the dither processing.

Figure 8:
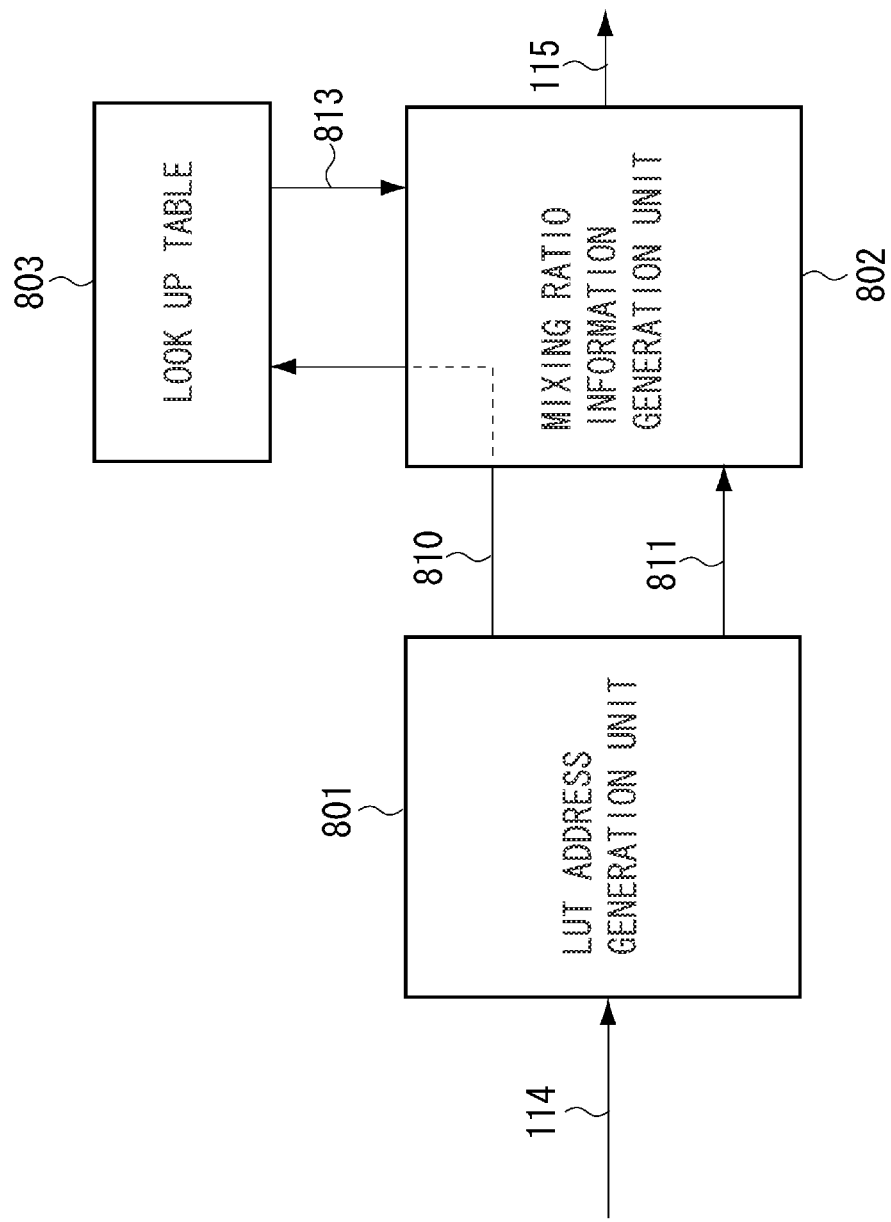
FIG. 8 is a block diagram illustrating a circuit configuration example of a mixing ratio determination unit according to the first exemplary embodiment.

A specific circuit configuration of a mixing ratio determination unit 105 is described with reference to FIG. 8. The mixing ratio determination unit 105 receives the density variable value 114 output from the difference value generation unit 104. A look-up table (LUT) address generation unit 801 separates the density variable value 114 into an integer part address 810 and a decimal part address 811. A mixing ratio information generation unit 802 reads mixing ratio data 813 stored in advance in a look-up table 803 in accordance with the integer part address 810 from the look-up table 803. Further, the mixing ratio information generation unit 802 interpolates mixing ratio data 813 in accordance with the decimal part address 811, and outputs mixing ratio information 115.

Referring back to FIG. 1, an image mixing unit 106 performs mixing processing on a target pixel basis of the input image data and the image data 111 output from the dither quantization unit 101 according to the following Expression (1), and generates output image data. An output terminal 116 sends the output image data to an N-valued (where N is an integer of 3 or more) image forming apparatus (not shown)

such as a laser beam printer with a pulse width modulation (PWM) output to form an image.

$$O(i,j)=\alpha(i,j)\times I(i,j)+(1-\alpha(i,j))\times D(i,j) \quad \text{Expression (1)}$$

In Expression (1), O is a density value of a target pixel of the output image data, I is a density value of a target pixel of the input image data, and D is a density value of a target pixel of the image data 111 after the dither processing output from the dither quantization unit 101. Further, α is the mixing ratio information 115, expresses a ratio of a density value of the target pixel in the input image data, and a range thereof is 0≤α≤1. Moreover, (i,j) indicates a two-dimensional coordinate of the target pixel.

An operation of the mixing ratio determination unit 105 and the image mixing unit 106 is described. For a simple description, it is assumed that the density variable value 114 is the integer part address 810 and the mixing ratio data 813 is the mixing ratio information 115.

Figure 9:
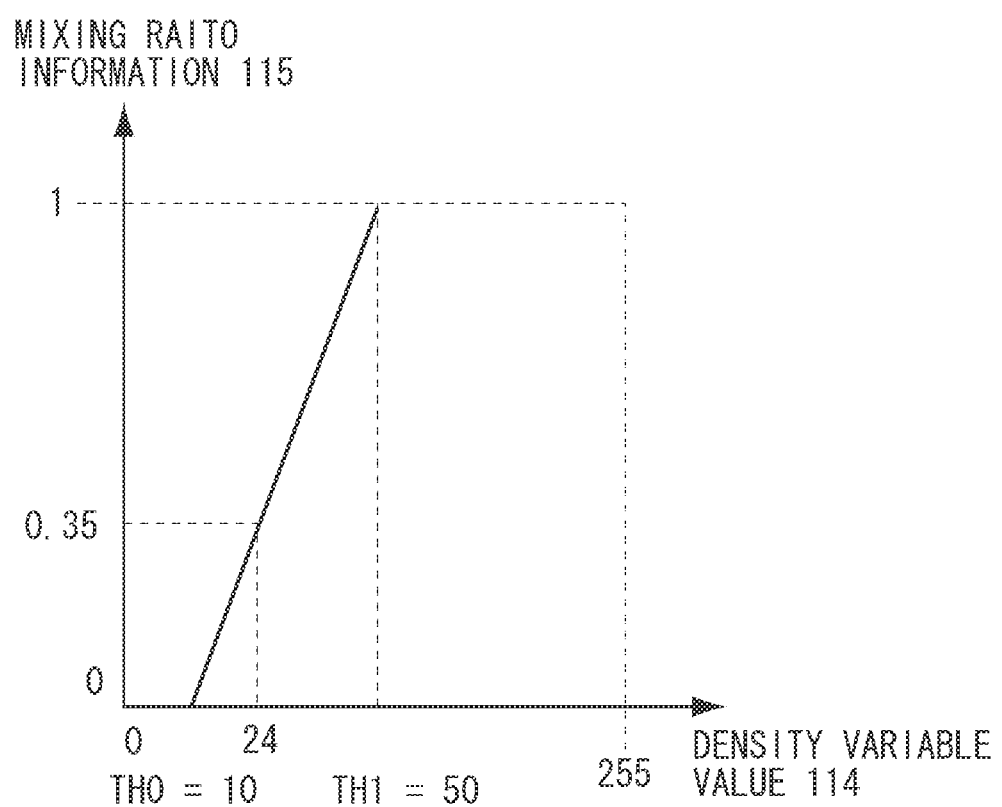
FIG. 9 illustrates an example of a look-up table of the mixing ratio determination unit according to the first exemplary embodiment.

FIG. 9 illustrates an example of the look-up table 803. According to the look-up table 803, when the density variable value 114 is 0 or more and less than 10 which is equivalent to threshold TH0, the mixing ratio information 115 becomes "0". When the density variable value 114 is 50, which is equivalent to threshold TH1, or more and is 255 or less, the mixing ratio information 115 becomes "1". Other than the above-mentioned density variable value 114, the mixing ratio information 115 has a value of "0<α<1".

More specifically, the density value of target pixel in the output image data is formed only from the density value of the target pixel in the image data 111 after the dither processing is performed when the density variable value 114 is "less than 10". When the density variable value 114 is "50 or more", the density value of the target pixel in the output image data is formed only from the density value of the target pixel in the input image data. Other than that, the density value of the target pixel in the output image data is formed by mixing the density value of the target pixel in the input image data and the density value of the target pixel in the image data 111 after the dither processing according to Expression (1).

When the density variable value 114 is "24", the mixing ratio information 115 becomes "0.35" from the look-up table in FIG. 9. When the density value of the target pixel in the input image data corresponding to the density variable value 114 is 114 and the density value of the target pixel in the image data 111 after the dither processing is 255, the following is obtained according to Expression (1).

$$O = 0.35 \times 114 + 0.65 \times 255$$
$$= 205.65$$

The density value of the target pixel in the output image data becomes approximately 206.

Figure 10A:
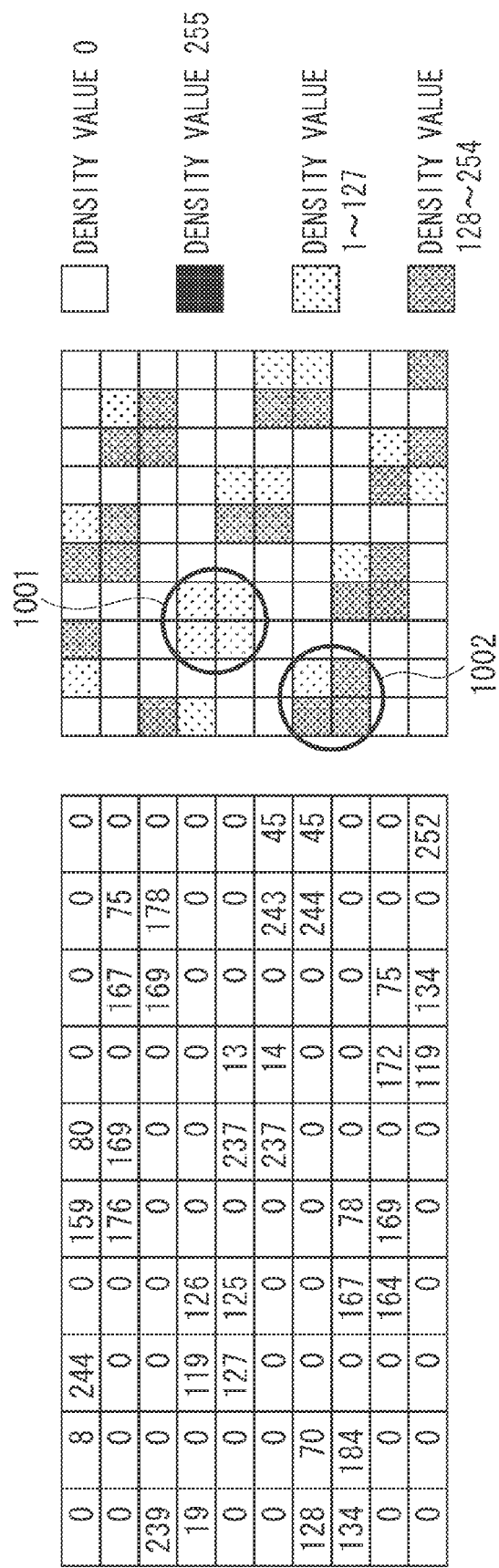
FIGS. 10A and 10B illustrate advantageous effect according to the first exemplary embodiment.
Figure 10B:
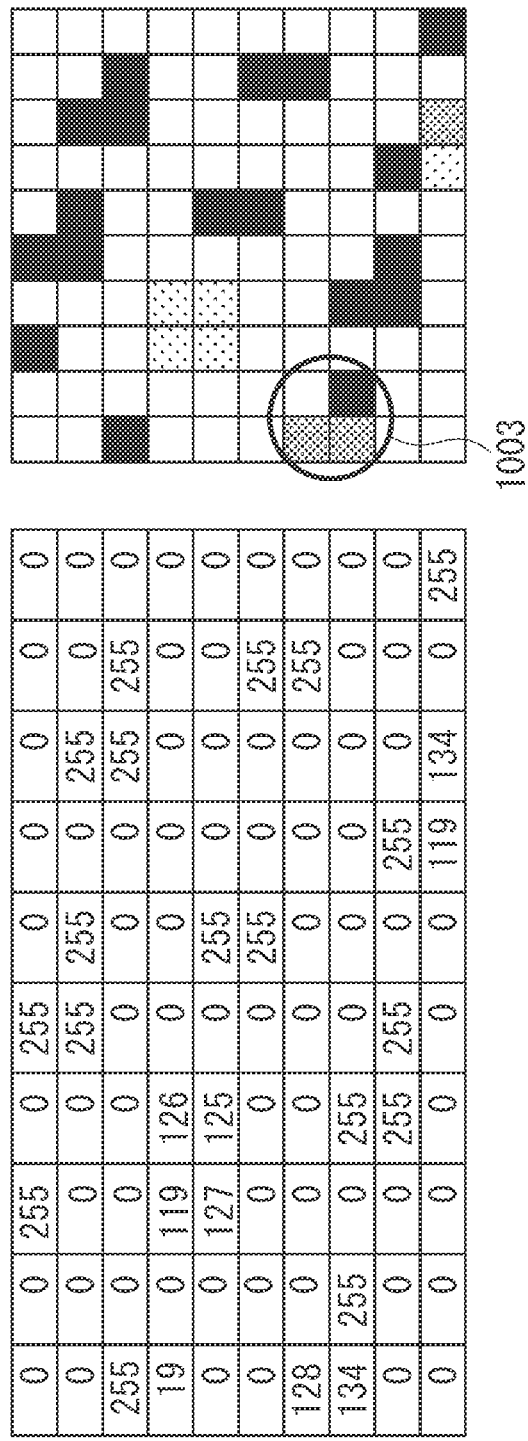

FIG. 10A illustrates an example in which another pixel is similarly subjected to the mixing processing and the density value of the target pixel in the output image data is calculated (hereinafter, referred to as density mixing processing). On the other hand, FIG. 10B is an example in which the mixing processing is not performed and a threshold TH2 is set to 50. When the density variable value 114 is TH2 or more, the density value of the target pixel in the input image data becomes the density value of the target pixel in the output image data. Other than that the density value of the target pixel in the image data 111 after the dither processing is performed is the density value of the target pixel in the output image data (hereinafter, referred to as density selection processing). A description with reference to FIGS. 10A and 10B is similar to that with reference to FIG. 2 and is therefore omitted.

As illustrated by an area 1001 in FIG. 10A, in the density mixing processing, a pattern causing the moire in the area 303 in FIG. 3 is removed, so that the interference is suppressed and the moire phenomenon is thus prevented. The density value is compared between an area 1002 in FIG. 10A and an area 1003 in FIG. 10B. In this case, the density values of pixels in the area 1003 in FIG. 10B excessively change due to switching between the image data after dither processing and the input image, thereby causing the feeling of strangeness. However, the density values of pixels in the area 1002 in FIG. 10A gradually change, and the feeling of strangeness is not caused. In the density selection processing of the output image data in FIG. 10B, the setting of the threshold TH2 to a proper value can prevent occurrence of the strangeness caused in the switching portion between the input image data and the image data after the dither processing is performed, to some degree. However, the threshold cannot be properly determined as to all arbitrary images, and complicated processing is to be added. In the density mixing processing of the output image data in FIG. 10A, only the mixing ratio information 115 for the mixing processing is determined from the look-up table 803 without complicated processing.

Figure 11:
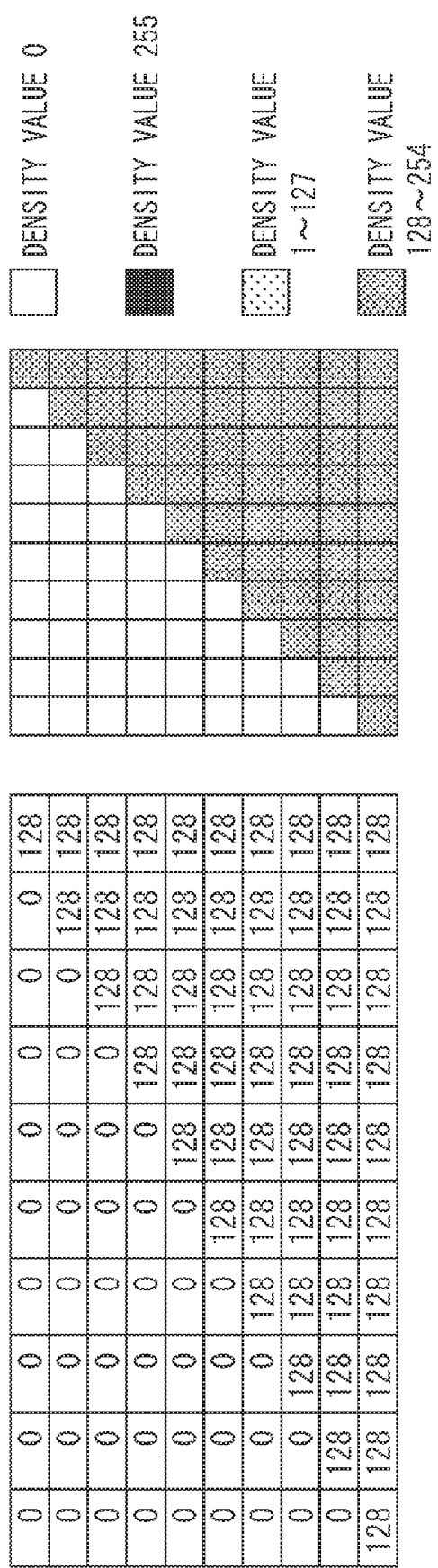
FIG. 11 illustrates an example of input image data according to the first exemplary embodiment.
Figure 12:
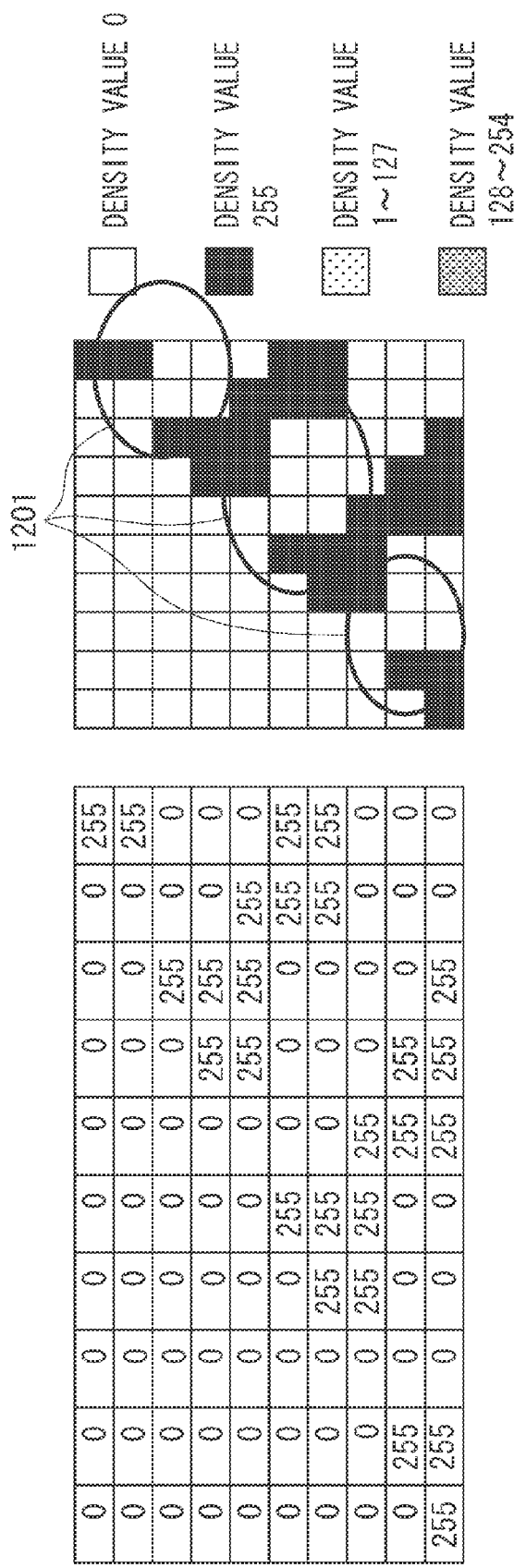
FIG. 12 illustrates an example of image data output from the dither quantization unit according to the first exemplary embodiment.

Input image data in FIG. 11 having an edge is considered. FIG. 12 illustrates an example of the input image data subjected to the dither processing in FIG. 11 with the dither quantization unit 101. A description with reference to FIGS. 11 and 12 is similar to that with reference to FIG. 2 and is omitted. As illustrated by an area 1201 in FIG. 12, edge portions are separated and it is therefore understood that jaggies (stepwise zigzag) are thus generated. It is understood that the jaggies interfere with the input image data and the moire is generated.

Figure 13A:
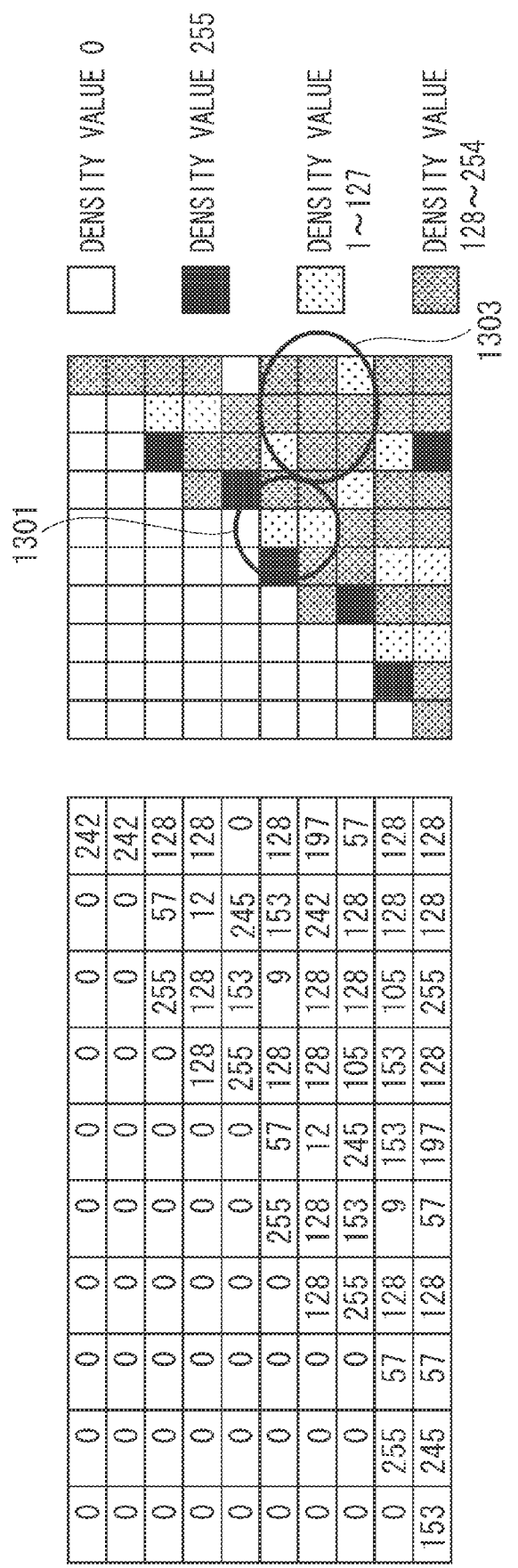

FIG. 13A illustrates output image data when inputting the input image data illustrated in FIG. 11 and the density mixing processing is performed. Output image data in FIG. 13A indicates an output image generated based on the processing content, the low-pass filter and the threshold when executing the output image processing in FIG. 10A. In contrast, FIG. 13B illustrates output image data when inputting the image data in FIG. 11 and performing the density selection processing. Output image data in FIG. 13B indicates an output image generated based on the processing content, the low-pass filter and the threshold when executing the output image processing in FIG. 10B.

A description with reference to FIGS. 13A and 13B is similar to that with reference to FIG. 2 and is therefore omitted. Comparing an area 1301 in FIG. 13A with an area 1302 in FIG. 13B, obviously, the jaggies of pixels in the area 1301 are more reduced than pixels in the area 1302. An area 1303 in FIG. 13A is compared with an area 1304 in FIG. 13B. Then, pixels in the area 1303 have the density difference between the density value of the target pixel in the input image data and the density value of target pixel after the dither processing, smaller than those of the area 1304 so that the strangeness due to the deterioration in image quality at the switching portion of the processing is reduced.

Although the mixing ratio determination unit 105 generates the mixing ratio information 115 with the look-up table 803 in the description, the mixing ratio information 115 may be generated with operation. When the density variable value 114 is proportional to the ratio of the density value of the target pixel in the input image data, the mixing ratio information 115 may be generated with the following Expression (2).

$$\alpha(i,j) = a \times J(i,j) + b \qquad \text{Expression (2)}$$

Herein, J is the density variable value 114, a is inclination of a linear function, b is intercept of the linear function, α is the mixing ratio information 115, and (i,j) is a two-dimensional coordinate of the target pixel. In order to set a range of the mixing ratio information 115 to "$0 \le \alpha \le 1$", the inclination a and the intercept b are set. Alternatively, when the mixing ratio information 115 is negative, α is fixed to 0 and, when the mixing ratio information 115 is 1 or more, α is fixed to 1. Although the linear function is used in Expression (2), it is not necessary to be linear as long as function is a monotonically increasing function.

The first low-pass filter unit 102 and the second low-pass filter unit 103 use the 3×3 low-pass filter, as an example of the low-pass filter, that removes the high frequency component of the input image data and the image data 111 after the dither processing. The processing may be performed so that the gradation becomes equal between the image data 112 and the image data 113. The low-pass filter may average the pixels in the dither matrix to cancel the dither noise. More specifically, with a 3×3 dither matrix, the low-pass filters obtain a moving average of the 3×3 matrix. Although 256 gradations with 8 bits are used as an example of the input image data, the present invention is not limited to this.

Although the look-up table having the threshold in FIG. 9 is described as an example of the look-up table 803, as the density variable value 114 is increased, the look-up table may monotonically increase (including the inclination of 0) so that α in the mixing ratio information 115 ranges as "$0 \le \alpha \le 1$". As described above, according to the first exemplary embodiment of the present invention, the image processing apparatus is provided to remove the drawbacks of the dither method without adding complicated processing and suppress the deterioration in image quality. The mixing ratio determination unit 105 determines the mixing ratio so that the density value of an output pixel of the image mixing unit 106 is within a density reproduction range of an image output apparatus (not illustrated).

According to the first exemplary embodiment, the moire due to periodicity of the dither processing is determined only with the density variable value 114, and the mixing ratio of the input image and the image after the dither processing is further determined. According to the mixing ratio, the density of the input image is mixed to that of the image after the dither processing. In contrast, in the second exemplary embodiment of the present invention, the moire is determined and the mixing ratio of the input image and the image after the dither processing is determined using the density variable value 114 and the amount of edges. According to the mixing ratio, the density of the input image is then mixed to that of the image after the dither processing.

Figure 14:
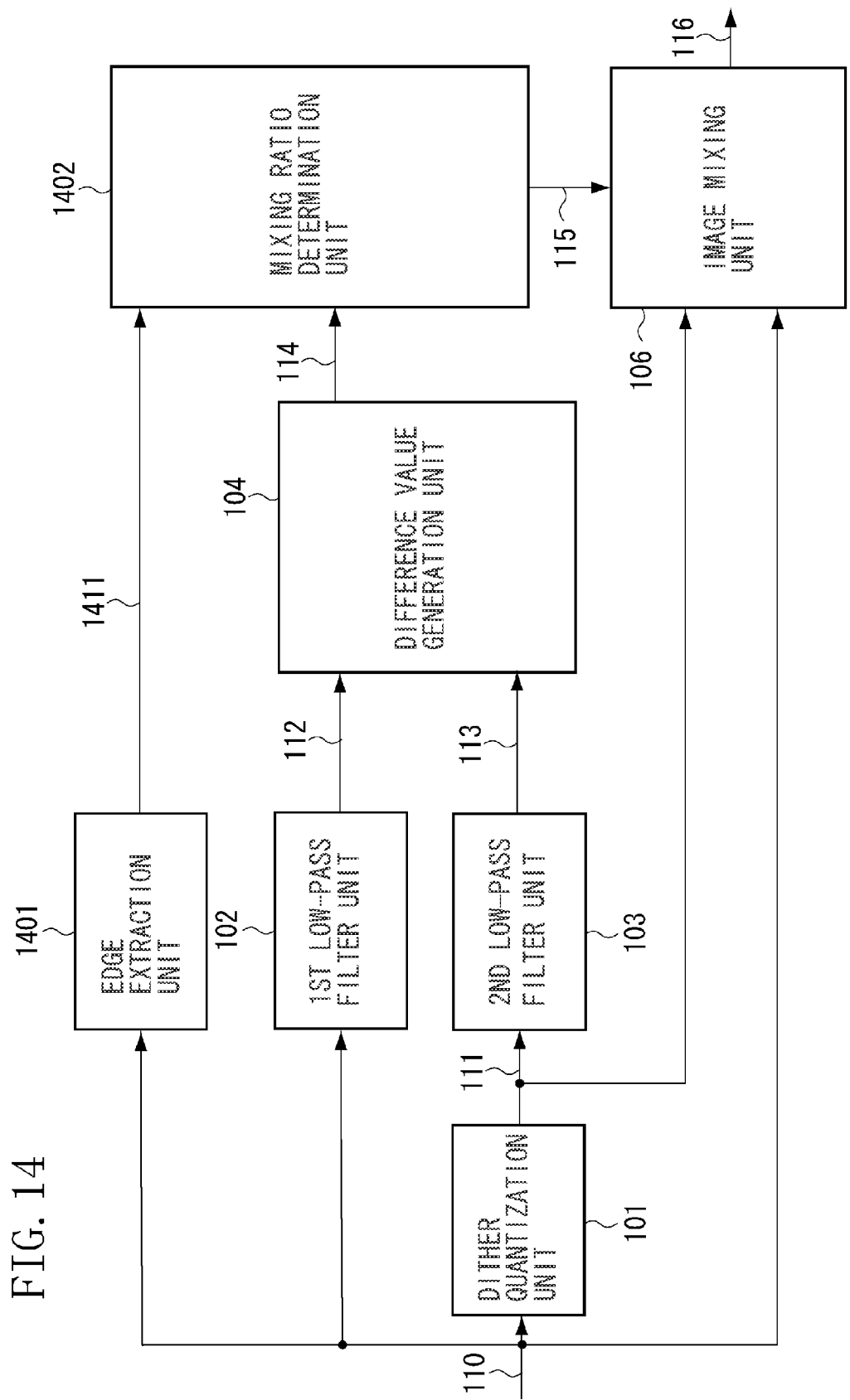
FIG. 14 is a block diagram illustrating a configuration example of an image processing apparatus according to a second exemplary embodiment of the present invention.

The configuration and operation are described according to the second exemplary embodiment. FIG. 14 is a block diagram illustrating a configuration example of an image processing apparatus according to the second exemplary embodiment. Referring to FIG. 14, an edge extraction unit 1401 and a mixing ratio determination unit 1402 are included. Other components are similar to those according to the first exemplary embodiment and are therefore designated by the same reference numerals, and are not described. It is assumed that the image data in FIG. 11 is input and the image data after the dither processing of the dither quantization unit 101 is the image data after the dither processing in FIG. 12.

The edge extraction unit 1401 extracts the edge (detects the amount of edges) of the image data from the input terminal 110 with well-known edge processing, typically, the Laplacian filter. The detection result is output as edge information 1411 indicating the intensity of edge of the input image data (multivalued image data).

Figure 15:
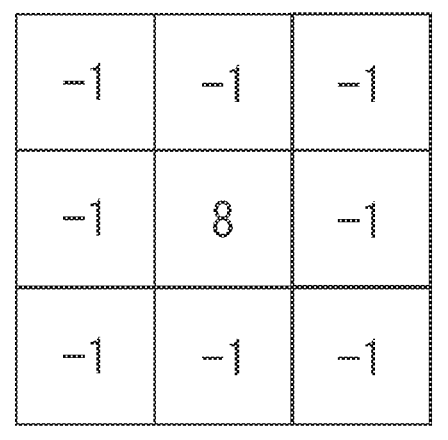
Figure 16:
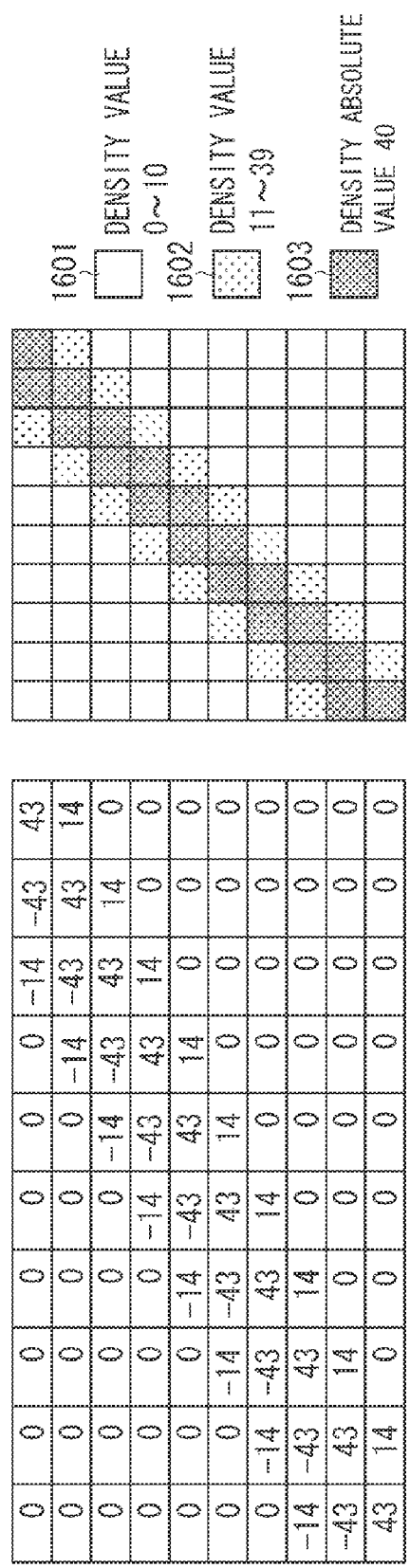
FIG. 16 illustrates an example of edge information according to the second exemplary embodiment.

With the Laplacian filter in FIG. 15, the edge is extracted and the edge information 1411 illustrated in FIG. 16 is acquired. One square in FIG. 16 indicates one pixel and a numeral of the pixel indicates a density value. Images 1601 to 1603 express the each pixel of the input image data so that a visual image can be easily made. Referring to FIG. 16, the density absolute value ranging 0 to 10 is illustrated with the image 1601, the density absolute value ranging 11 to 39 is illustrated with the image 1602, and the density absolute value of 40 or more is illustrated with the image 1603. The mixing ratio determination unit 1402 outputs the mixing ratio information 115 from the density variable value 114 output from the difference value generation unit 104 and the edge information 1411.

Figure 17:
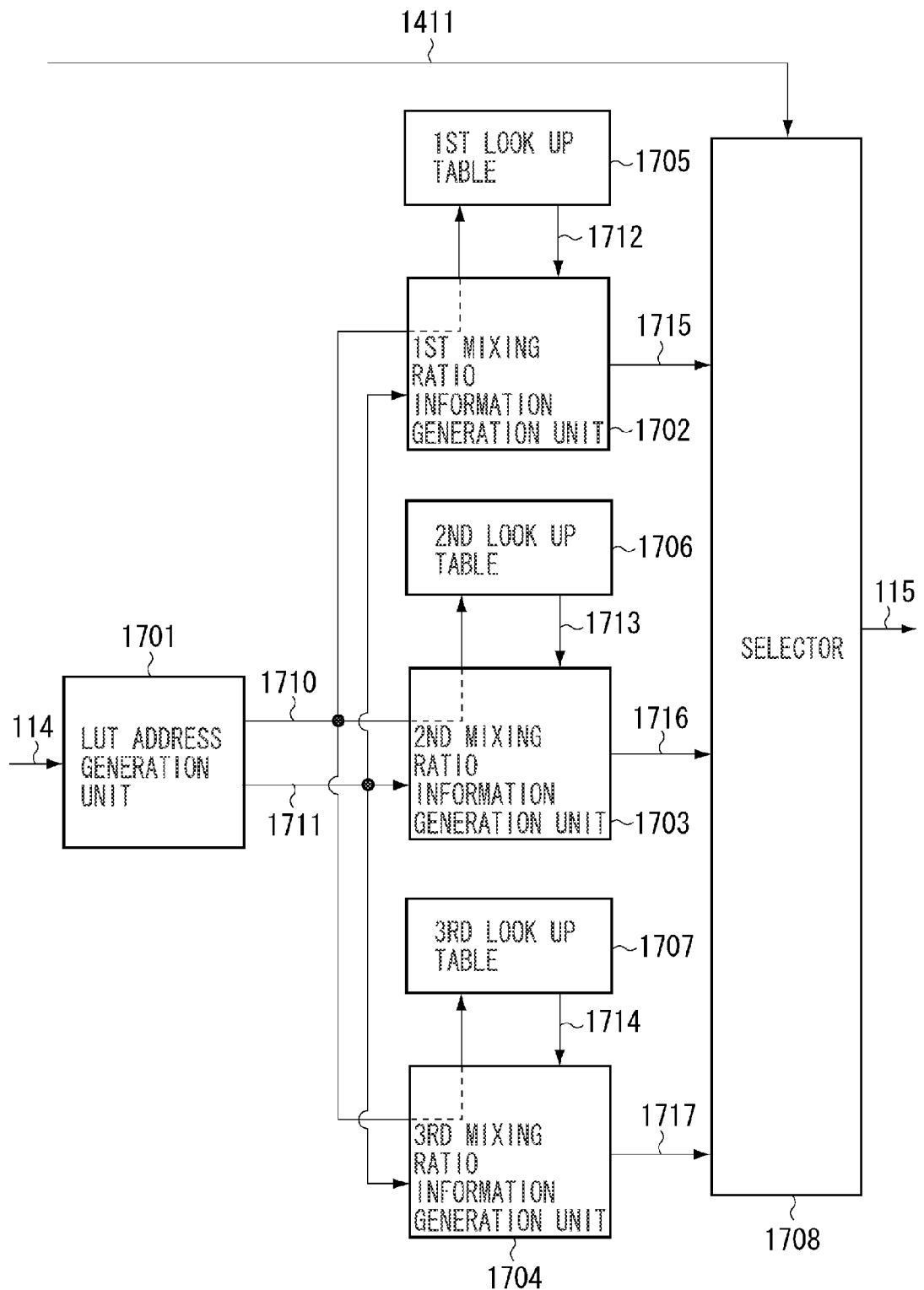
FIG. 17 is a block diagram illustrating a circuit configuration of a mixing ratio determination unit according to the second exemplary embodiment.

A specific configuration of the mixing ratio determination unit 1402 is described below with reference to FIG. 17. The mixing ratio determination unit 1402 receives the density variable value 114 output from the difference value generation unit 104 and the edge information 1411 output from the edge extraction unit 1401. A look-up table (LUT) address generation unit 1701 separates the density variable value 114 into an integer part address 1710 and a decimal part address 1711, and sends the separated values to the first mixing ratio information generation unit 1702, the second mixing ratio information generation unit 1703, and the third mixing ratio information generation unit 1704.

The first mixing ratio information generation unit 1702 reads out the first mixing ratio data 1712 stored in advance in a first look-up table 1705 at the integer part address 1710 from the first look-up table 1705. Further, the first mixing ratio information generation unit 1702 interpolates the first mixing ratio data 1712 at the decimal part address 1711 and outputs a first mixing ratio information candidate value 1715.

Similarly, the second mixing ratio information generation unit 1703 reads out second mixing ratio data 1713 stored in advance in a second look-up table 1706 at the integer part address 1710 in the second look-up table 1706. Further, the second mixing ratio information generation unit 1703 interpolates the second mixing ratio data 1713 at the decimal part address 1711, and outputs the second mixing ratio information candidate value 1716.

Similarly, the third mixing ratio information generation unit 1704 reads out third mixing ratio data 1714 stored in advance in a third look-up table 1707 at the integer part address 1710 in the third look-up table 1707. Further, the third mixing ratio information generation unit 1704 interpolates the third mixing ratio data 1714 at the decimal part address 1711 and outputs a third mixing ratio information candidate value 1717.

A selector 1708 selects any of the first mixing ratio information candidate value 1715, the second mixing ratio information candidate value 1716, and the third mixing ratio information candidate value 1717 based on the edge information 1411, and outputs the selected value as the mixing ratio information 115.

An operation of a mixing ratio determination unit 1402 is described with reference to FIG. 17. For a simple description, it is assumed that the density variable value 114 is the integer part address 1710, the first mixing ratio data 1712 is the first mixing ratio information candidate value 1715, the second mixing ratio data 1713 is the second mixing ratio information candidate value 1716, and the third mixing ratio data 1714 is the third mixing ratio information candidate value 1717.

Figure 18A:
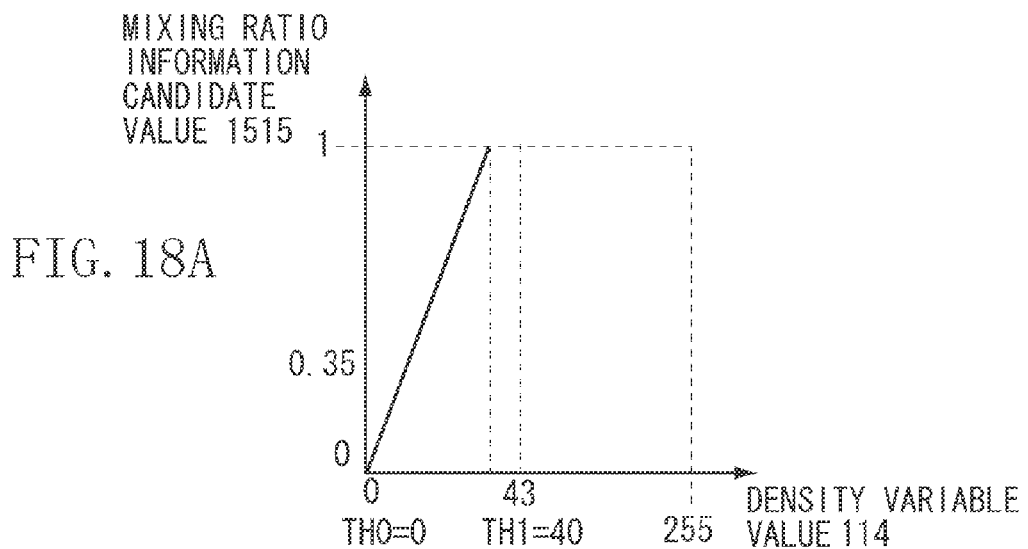
FIGS. 18A, 18B, and 18C illustrate examples of a first look-up table, a second look-up table, and a third look-up table according to the second exemplary embodiment.
Figure 18B:
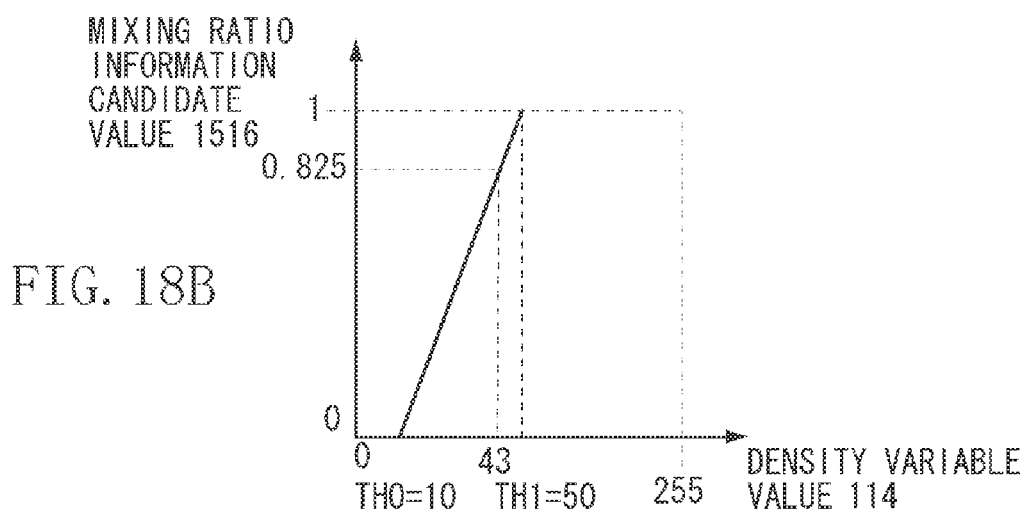
Figure 18C:
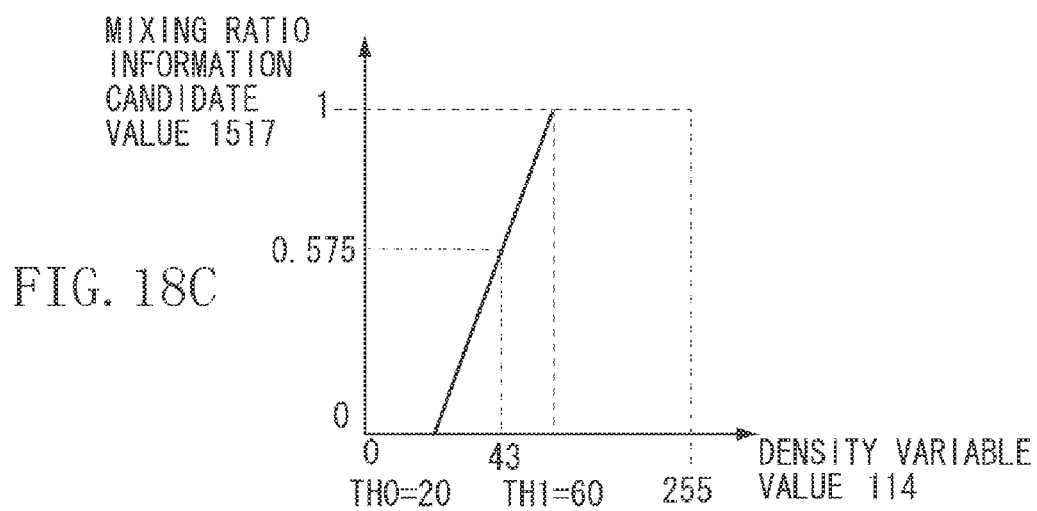

The density variable value 114 for input is "46", and the edge information 1411 output from the edge extraction unit 1401 is "43". FIG. 18A illustrates the first look-up table 1705, FIG. 18B illustrates the second look-up table 1706, and FIG. 18C illustrates the third look-up table 1707. The second look-up table 1706 in FIG. 18B is the same as the look-up table 803 in FIG. 9.

In the first look-up table 1705 in FIG. 18A threshold value TH0 is set to 0 and TH1 is set to 40. In the second look-up table 1706 in FIG. 18B threshold value TH0 is set to 10 and TH1 is set to 50. In the third look-up table 1707 in FIG. 18C threshold value TH0 is set to 20 and TH1 is set to 60.

The selector 1708 uses selection conditions illustrated in FIG. 19. When the absolute value of the edge information 1411 is 40 or more (hereinafter, referred to as area A), the selector 1708 in FIG. 19 selects the first mixing ratio information candidate value 1715. When the absolute value of the edge information 1411 is less than 40 and is 10 or more (hereinafter, referred to as area B), the selector 1708 in FIG. 19 selects the second mixing ratio information candidate value 1716. When the absolute value of the edge information 1411 is less than 10 (hereinafter, referred to as area B), the selector 1708 in FIG. 19 selects the third mixing ratio information candidate value 1717.

The density variable value 114 is sent to the first mixing ratio information generation unit 1702, the second mixing ratio information generation unit 1703, and the third mixing ratio information generation unit 1704 so that the units respectively generate the mixing ratio information candidate values from the corresponding look-up tables.

The density variable value 114 is "46", and the corresponding first mixing ratio information candidate value 1715 is "1" in the first look-up table 1705 in FIG. 18A. The second mixing ratio information candidate value 1716 is "0.825" in the second look-up table 1706 in FIG. 18B. The third mixing ratio information candidate value 1717 is "0.575" in the third look-up table 1707 in FIG. 18C.

Under the selection conditions in FIG. 19, the absolute value 43 as the edge information 1411 belongs to the area A, and the selector 1708 selects 1 as the first mixing ratio information candidate value 1715 indicated by the area A, and outputs the selected value as the mixing ratio information 115.

Since the target pixel of the corresponding input image data is determined as an edge portion, the mixing ratio information 115 is generated from the first look-up table 1705 having the highest mixing ratio of the input image data and the lowest mixing ratio of the image data after the dither processing. Assuming that the density value of the target pixel in the input image data corresponding to the mixing ratio information 115 is 128 and the target pixel density value of the image data 111 after the dither processing is 255, the following is obtained from Expression (1).

$$O = 1.000 \times 128 + 0.00 \times 255$$
$$= 128$$

The density value of the target pixel in the output image data is 128.

Figure 20:
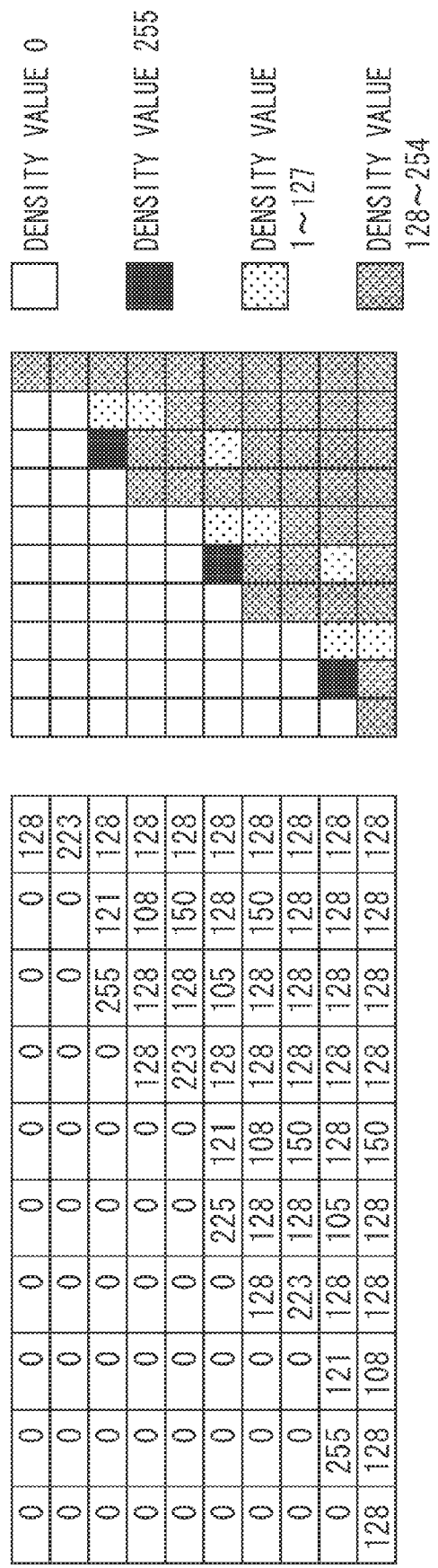
FIG. 20 illustrates an example of output image data according to the second exemplary embodiment.

FIG. 20 illustrates an example of similarly calculating the density value of the output pixel to another input pixel. A description with reference to FIG. 20 is similar to that with FIG. 2 and is omitted. Obviously, jaggies at the edge portion are reduced in the output image data in FIG. 20, as compared with those in the output image data in FIG. 13A according to the first exemplary embodiment.

The second exemplary embodiment employs not only the density variation but also the amount of edges for the moire detection. As a consequence, the number of the look-up tables according to the second exemplary embodiment is larger than that according to the first exemplary embodiment. However, an image with reduced jaggies at the edge portion is generated.

The description includes the first look-up table 1705, the second look-up table 1706, and the third look-up table 1707 with reference to FIGS. 18A and 18B. However, the look-up table is not limited to those. The mixing ratio determination unit 1402 uses three types of the look-up tables including the first look-up table 1705, the second look-up table 1706, and the third look-up table 1707. However, the number of the look-up table and the mixing ratio information generation units thereof are not limited to three. The selector 1708 determines the mixing information candidate value under the selection conditions in FIG. 19. However, the selection conditions are not limited to these. The 3×3 Laplacian filter in FIG. 15 is used for the edge extraction of the edge extraction unit 1401. However, the filter is not limited to this. According to the second exemplary embodiment of the present invention, the drawback of the dither method is removed without adding complicated processing and the image processing apparatus that suppresses the deterioration in image quality is provided.

According to the exemplary embodiments, the calculation of the density variable value 114 uses the low-pass filter unit for the input image data 110 and the low-pass filter unit for the image data 111 output from the dither quantization unit 101. However, the two low-pass filter units are not necessarily provided. For example, a difference value between the input image data 110 and the image data 111 output from the dither quantization unit 101 may be calculated, and the obtained difference value may be subjected to processing of the low-pass filter. This operation enables the calculation of the density variable value, similar to that according to the exemplary embodiments.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-266770 filed Nov. 24, 2009, which is hereby incorporated by reference herein in its entirety.

What is claimed is:

1. An apparatus comprising:
a processing unit configured to perform halftone processing for input image data and output halftone image data;
a determination unit configured to determine a mixing ratio based on a difference value between a low frequency component of the halftone image data and a low frequency component of the input image data; and
a mixing unit configured to generate output image data by mixing the input image data and the halftone image data based on the mixing ratio,
wherein the output image data includes a pixel having a pixel value constituting the input image data, a pixel having a pixel value constituting the halftone image data, and a pixel having a pixel value calculated based on the pixel value constituting the input image data and the pixel value constituting the halftone image data.

2. The apparatus according to claim 1, wherein the determination unit comprises:
a first low-pass filter unit configured to perform low-pass filter processing for the input image data;
a second low-pass filter unit configured to perform low-pass filter processing for the halftone image data; and
a generation unit configured to generate a difference absolute value between an output value of the first low-pass filter unit and an output value of the second low-pass filter.

3. The apparatus according to claim 2, wherein the halftone processing is dither processing, and
the low-pass filter cuts a frequency component larger than a dither period of the dither processing.

4. The apparatus according to claim 1, further comprising:
an extraction unit configured to extract an edge based on the input image data,
wherein the determination unit determines the mixing ratio based on the extracted edge and the difference value.

5. The apparatus according to claim 1, wherein, in the determination unit, each of the mixing ratio of the input image data and the mixing ratio of the halftone image data is no less than zero but no more than 1, and the sum of the mixing ratios is 1, and
wherein when the absolute value of the difference value is larger than a first threshold value, the mixing ratio of the input image data is 1,
when the absolute value of the difference value is smaller than the first threshold value and larger than a second threshold value, the mixing ratio of the input image data is set to a value which is larger than zero but smaller than 1, and
when the absolute value of the difference value is smaller than the second threshold value, the mixing ratio of the input image data is zero.

6. The apparatus according to claim 1, further comprising:
an edge detection unit configured to detect an edge amount of the input image data, and
a holding unit configured to hold a plurality of look up tables for setting the mixing ratio based on the difference value,
wherein the determination unit selects the look up table from the plurality of look up tables held by the holding unit in accordance with the edge amount, and determines the mixing ratio according to the selected look up table.

7. The apparatus according to claim 1,
wherein the holding unit holds the first look up table for setting the mixing ratio and the second look up table for setting the mixing ratio which is different from the first look up table,
wherein the mixing ratio, which the pixel value constituting the halftone image data is to be the output image data, is more outputtable by using the second look up table than by using the first look up table, and
wherein the determination unit selects the second look up table in a case where the edge amount is small.

8. A method comprising:
performing halftone processing for input image data and outputting halftone image data;
determining a mixing ratio based on a difference value between a low frequency component of the halftone image data and a low frequency component of the input image data; and
generating output image data by mixing the input image data and the halftone image data based on the mixing ratio,
wherein the output image data includes a pixel having a pixel value constituting the input image data, a pixel having a pixel value constituting the halftone image data, and a pixel having a pixel value calculated based on the pixel value constituting the input image data and the pixel value constituting the halftone image data.

9. The method according to claim 8, further comprising:
performing low-pass filter processing for the input image data by a first low-pass filter;
performing low-pass filter processing for the halftone image data by a second low-pass filter; and
generating a difference absolute value between an output value of the first low-pass filter unit and an output value of the second low-pass filter.

10. The method according to claim 9, wherein the halftone processing is dither processing, and
the performing low-pass filter processing comprises cutting a frequency component larger than a dither period of the dither processing.

11. The method according to claim 8, further comprising:
extracting an edge based on the input image data,
wherein the determining the mixing ratio is based on the extracted edge and the difference value.

12. A non-transitory computer-readable recording medium recording a program for realizing computer to execute a method comprising:
performing halftone processing for input image data and outputting halftone image data;
determining a mixing ratio based on a difference value between a low frequency component of the halftone image data and a low frequency component of the input image data; and
generating output image data by mixing the input image data and the halftone image data based on the mixing ratio,
wherein the output image data includes a pixel having a pixel value constituting the input image data, a pixel having a pixel value constituting the halftone image data, and a pixel having a pixel value calculated based on the pixel value constituting the input image data and the pixel value constituting the halftone image data.

13. The non-transitory computer-readable recording medium according to claim 12, further comprising:
performing low-pass filter processing for the input image data by a first low-pass filter;
performing low-pass filter processing for the halftone image data by a second low-pass filter; and
generating a difference absolute value between an output value of the first low-pass filter unit and an output value of the second low-pass filter.

14. The non-transitory computer-readable recording medium according to claim 13, wherein the halftone processing is dither processing, and
   the performing low-pass filter processing comprises cutting a frequency component larger than a dither period of the dither processing.

15. The non-transitory computer-readable recording medium according to claim 12, further comprising:
   extracting an edge based on the input image data,
   wherein the determining the mixing ratio is based on the extracted edge and the difference value.

* * * * *